United States Patent

[11] 3,550,503

| | | |
|---|---|---|
| [72] | Inventor | Louis Pallay<br>Pierrefonds, Quebec, Canada |
| [21] | Appl. No. | 799,852 |
| [22] | Filed | Feb. 17, 1969 |
| [45] | Patented | Dec. 29, 1970 |
| [73] | Assignee | Sperry Rand Canada Limited<br>Toronto, Ontario, Canada |
| [32] | Priority | Sept. 30, 1968 |
| [33] | | Canada |
| [31] | | 31,294 |

[54] MACHINE TOOL WORK LOADING AND UNLOADING APPARATUS
10 Claims, 5 Drawing Figs.

[52] U.S. Cl. .................................................. 90/11,
90/20, 90/21; 77/5; 82/2.5
[51] Int. Cl. ............................................... B23c 1/02,
B23b 13/02
[50] Field of Search ........................................ 90/20, 21,
11; 82/2.5, 2.7; 77/5.1; 51/(Inquired);
214/(Inquired)

[56] References Cited
UNITED STATES PATENTS
2,877,676   3/1959   Swanson et al. .............. 82/2.7
3,435,963   4/1969   Jacoby et al. ................. 82/2.7
3,455,190   7/1969   Dalik ............................ 82/2.7

*Primary Examiner*—Gil Weidenfeld
*Attorney*—S. C. Yeaton

ABSTRACT: Machine tool apparatus including a transfer mechanism having a rotatable work holding member for transferring work to and from the chuck mechanism of a rotating spindle. The chuck mechanism comprises a rod coaxially mounted within and keyed to the spindle, thus enabling the rod to translate relative to the spindle while rotating synchronously therewith. An actuator at one end of the rod regulates axial motion of the rod relative to the spindle such that a tapered section on the other end is operative to control chuck jaws for grasping and releasing the work as it is transferred between the spindle and transfer mechanism. In operation, the work holding member is at rest while the work is loaded into it and thereafter it is driven at a rate approximately equal to that of the spindle so that the work may be transferred thereto with minimum speed differential. Removal of the work at the completion of a machining cycle is accomplished substantially by a reversal of the loading procedure.

INVENTOR.
LOUIS PALLAY
BY
S. C. Yeaton
ATTORNEY

INVENTOR.
LOUIS PALLAY

INVENTOR
LOUIS PALLAY
BY
S.C. Yeaton
ATTORNEY

MACHINE TOOL WORK LOADING AND UNLOADING APPARATUS

BACKGROUND OF THE INVENTION

The present invention relates to machine tools and more particularly to means for loading and unloading work on a rotating spindle assembly to preclude the necessity for starting and stopping the spindle at the beginning and end of each machining cycle.

Most machining operations aside from those performed in accordance with recent technological advances, for example, a laser beam cutting through strips of metal or other material, require relative motion, usually both rotation and translation, between a workpiece and cutting tool. In general, it is immaterial whether the relative motion is obtained by moving the tool or the work but in some cases it is necessary or at least preferable for one reason or another that the relative rotation be provided by rotating the work. In such instances, it has been the practice heretofore to stop the rotating assembly to which the work is attached when placing it on or removing it from the machine. This procedure substantially reduces productivity particularly with high-speed machines because considerable time is utilized starting and stopping the rotating member. In some instances, the time required for stopping the machine has been shortened by utilizing a brake mechanism and occasionally, where low speeds have been involved, the necessity for repetitive starting and stopping has been eliminated by loading nonrotating workpieces directly onto a rotating spindle, the converse procedure being used for unloading the work. These techniques are restricted, however, to relatively low speed applications and are not generally suitable because they produce considerable shock and wear on both the work and the machine.

SUMMARY OF THE INVENTION

The present invention overcomes the aforementioned limitations of the prior art by the provision of a transfer mechanism having a rotatable work holding member operating in conjunction with a chuck mechanism having a rod coaxially mounted within and keyed to a machine tool spindle for loading and unloading work. The work holder and spindle are rotated at approximately the same speed to enable work to be transferred therebetween with minimum shock and wear.

A loading sequence is performed as follows. Work is placed in the work holder while it is stationary in a position displaced from collinear alignment with the spindle rotational axis. The work holder is then accelerated to a rate approximately equal to that of the spindle as its axis of rotation is moved into collinear alignment with the spindle axis, after which a rapid feed mechanism operates in conjunction with a spring to move the chuck rod into contact with the work. This action synchronizes the rotational rates of the spindle and work holder. Next, a chuck actuator operates to cause the spindle face to move into contact with the work and to retract the chuck rod thereby forcing the chuck jaws firmly against the work. At this point the rapid feed mechanism operates first to withdraw the work from the work holder, which thereafter is retracted out of collinear alignment with the spindle axis, and then to move the spindle machine way against a fine feed mechanism which controls the rate of feed to the cutting tool. At the completion of the machining process, the work is removed from the chuck mechanism essentially by a reversal of the sequence used for loading.

The various steps in the loading and unloading sequences may be initiated and terminated by either operator commands or sensing devices such as cam actuated switches operating in combination with suitable control circuits. The invention does not involve the control circuits, however, but resides in the concept and the provision of means for transferring a rotating workpiece to and from a rotating spindle. Therefore, although a semiautomatic configuration is explained in the following detailed description, the control circuits are omitted for simplicity of illustration.

DESCRIPTION OF THE PREFERRED EMBODIMENT

Figure 1:
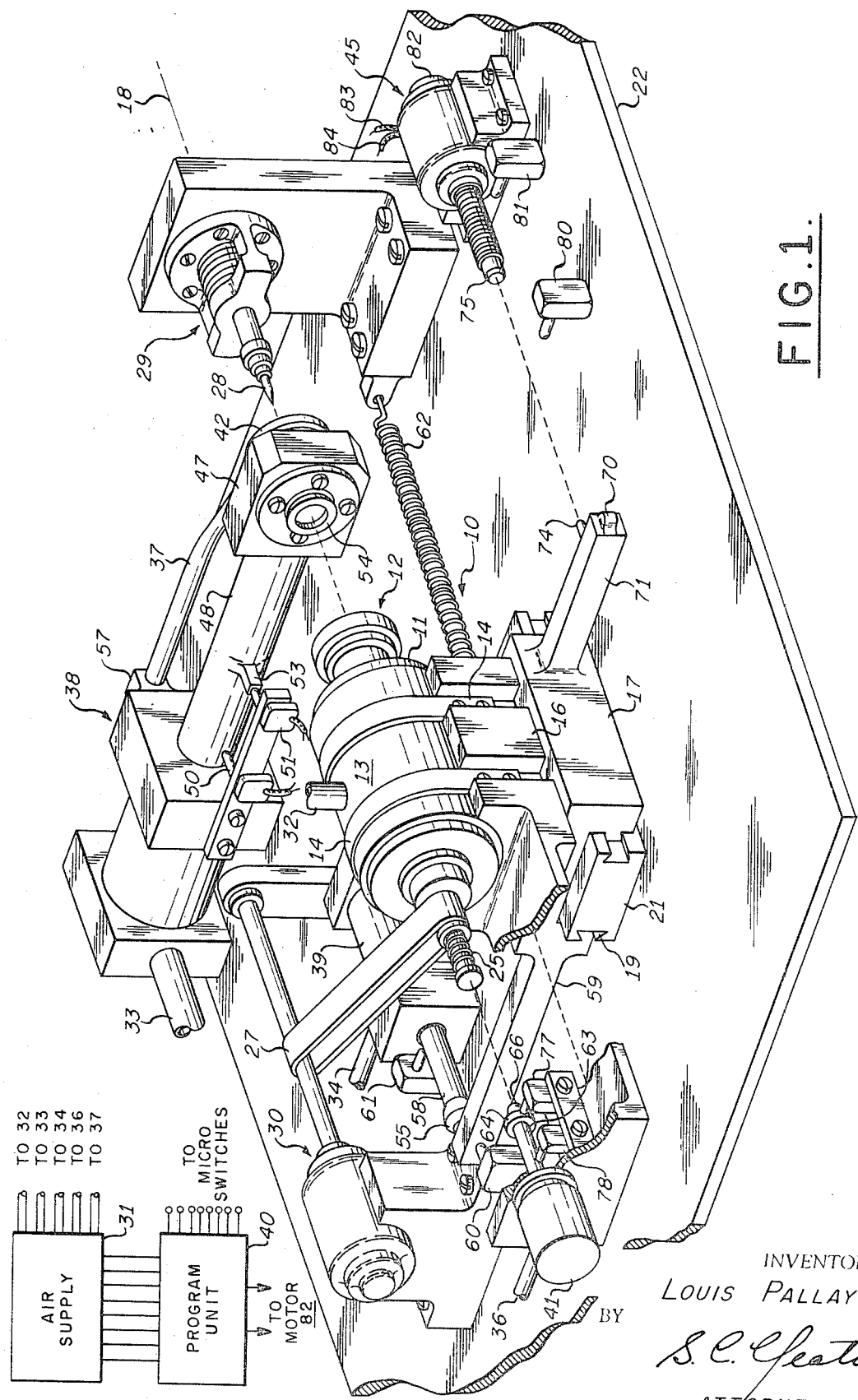
FIG. 1 is a perspective drawing of a preferred embodiment of the invention.
Figure 2:
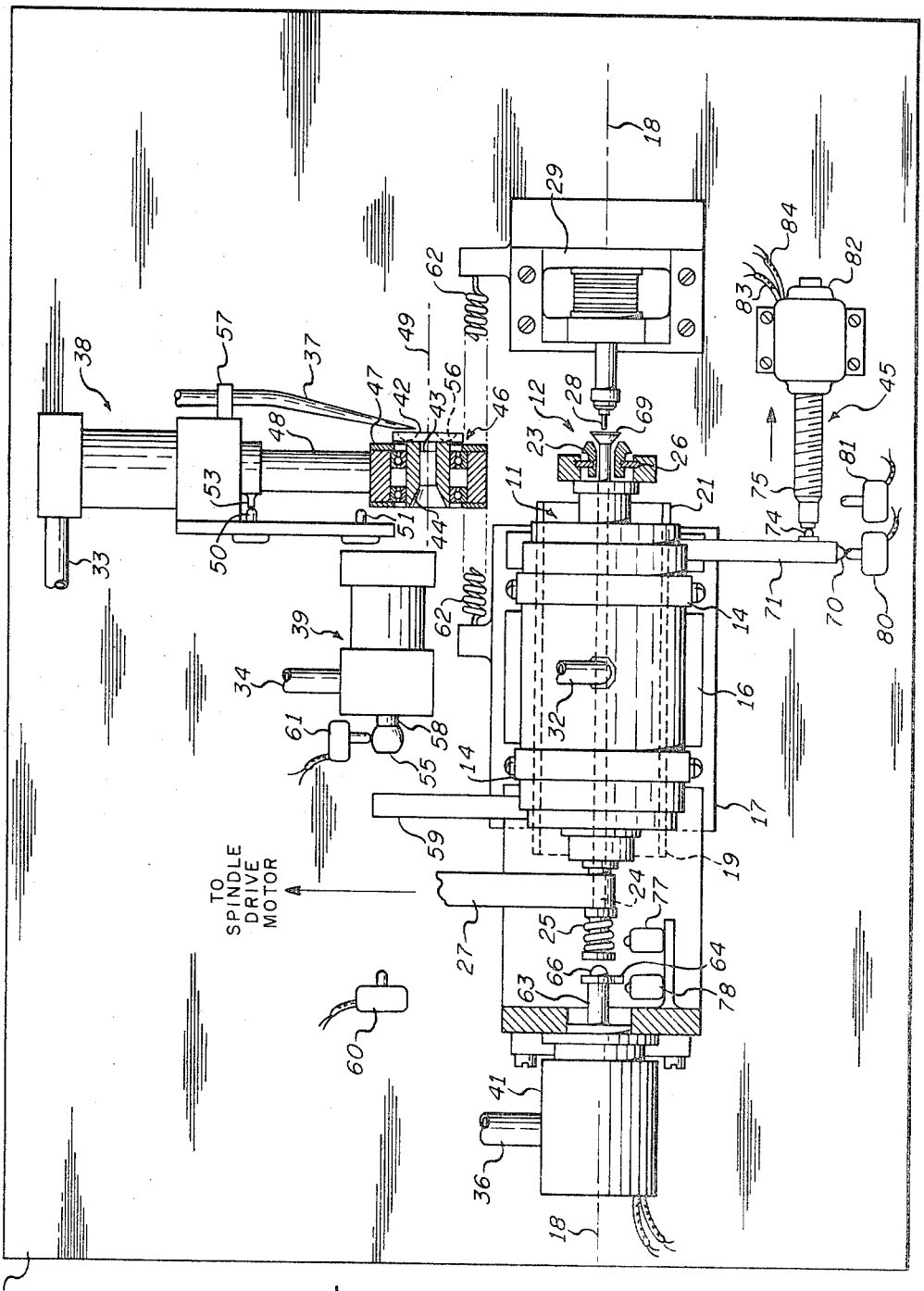
FIG. 2 is a plan view of the preferred embodiment shown in FIG. 1.

Referring to FIGS. 1 and 2, spindle assembly 10 comprises a spindle 11, chuck mechanism 12 and spindle housing 13 fastened by straps 14 to mounting block 16 affixed to precision ball slide 17 which translates parallel to the longitudinal axis 18 of the spindle assembly in track 19 of machine way 21 supported on machine tool bed 22. The chuck mechanism, which is concentrically mounted in the spindle, includes chuck jaws 23, a chuck rod 24 slightly longer than the spindle and tapered at the end proximate the chuck jaws, and a spring 25 connected between the ends of the rod and spindle distal the chuck jaws. The chuck jaws are encircled at one end by an expandable band 26 so as to hold the other end of the jaws against the chuck rod. Belt 27 connected to spindle 11 is driven by an electric motor 30 or other drive means such as an air turbine to rotate the spindle about its longitudinal axis which is collinearly aligned with the longitudinal axis of cutting tool 28 on tool assembly 29. A longitudinally-extending slot and key arrangement (not shown) connects the spindle and chuck rod so that they rotate in synchronism but can translate axially relative to one another. An air supply 31 connected to the spindle housing by tube 32 provides air bearing support for the spindle. Axially free journal bearings may be used in the spindle assembly but a journal bearing with a thrust face is preferred in accordance with good machine tool design to restrain axial motion of the spindle relative to the spindle housing. The air supply also connects to tubes 33, 34, 36 and 37 joined respectively to the transfer mechanism 38, rapid feed mechanism 39, chuck actuator mechanism 41 and turbine 42. Programming unit 40 comprises electronic circuits responsive to operator commands and signals from switches associated with the pneumatic devices, i.e., the transfer, rapid feed and chuck actuator mechanisms, and the fine feed mechanism 45, to control the sequence of operation as will be described subsequently.

Transfer mechanism 38 comprises a permanent magnet 43 inserted in rotatable work-holding member 44 which is attached to air turbine 42 and connected through ball bearing unit 46 to concentric housing 47 affixed to transfer arm 48. The transfer arm translates perpendicular to the spindle longitudinal axis through a range determined by microswitches 50 and 51 to move the rotational axis 49 of work holder 44 in and out of collinear alignment with the spindle axis.

Figure 3A:
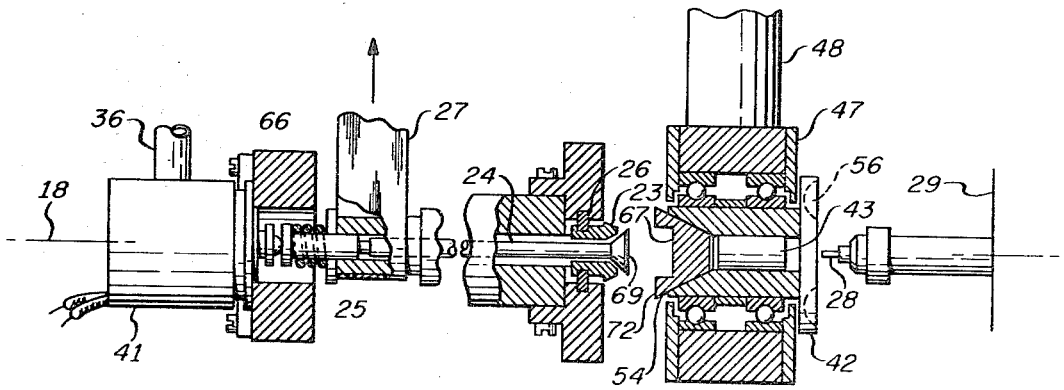
FIGS. 3a to 3c are partial sections taken along the longitudinal axis of FIG. 1.
Figure 3B:
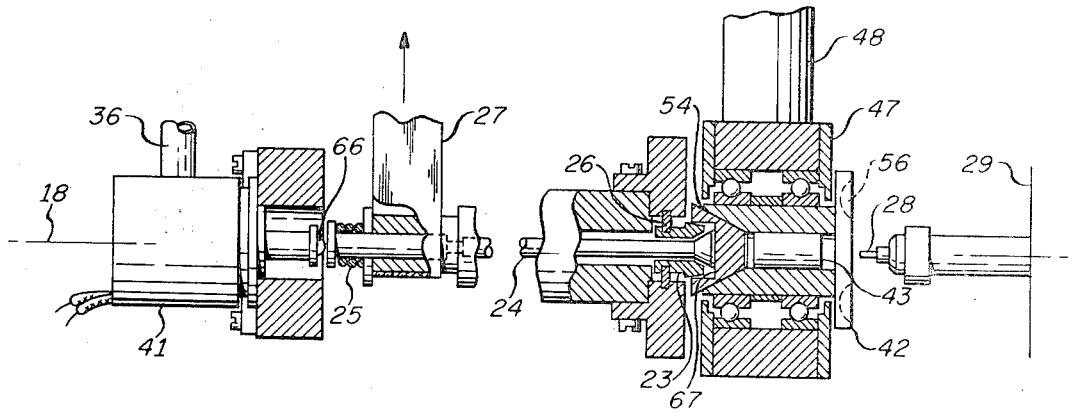
Figure 3C:
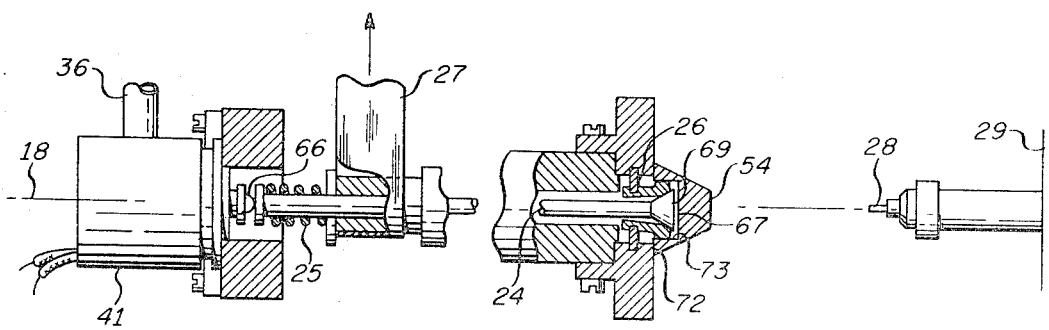

At the beginning of a loading sequence, before power is applied to the system, transfer arm 48, rapid feed shaft 58 and actuator arm 63 are in a retracted position and cam 70 on bar 71 connected to precision ball slide 17 is in contact with fine feed switch 80 as shown in FIG. 2. Under these conditions ball stop 74 on bar 71 rests against fine feed screw 75. In addition, transfer arm 48 is positioned so that cam 53 actuates switch 50. In this position of the transfer arm, the rotational axis of work holder 44 is displaced from alignment with the longitudinal spindle axis in readiness for magnetic workpiece 54 to be placed in contact with magnet 43 and then quickly accelerated to approximately the same speed as spindle 11 by air supplied to cups 56 on air turbine 42 through tube 37 held in clamp 57 attached to the transfer arm. In the case of nonmagnetic workpieces, the permanent magnet may be replaced by an O-ring into which the workpieces would be inserted. Once these initial conditions have been established, the sequence continues in response to an operator command accomplished by closing a switch on the programming unit whereupon a signal provided through the closed contacts of switch 50 actuates rapid feed mechanism 39 causing rapid feed shaft 58 to move into contact with precision ball slide extension 59 and drive precision ball slide 17 against the restraint of spring 62 until the extension actuates switch 60. Next air is supplied through tube 37 to rotate the work holder and to tube 33 to move the transfer arm until cam 53 actuates switch 51 at which time the rotational axis of the work holder is collinearly aligned with the spindle axis as shown in FIG. 3a and then air is supplied to chuck actuator mechanism 41 causing ball contact 66 on the end of nonrotating actuator arm 63 to engage chuck rod 24 and translate it relative to the spindle thereby compressing spring 25 until cam 64 actuates switch 77. A signal is then applied through switch 77 to shut off the air supplied to the rapid feed mechanism 39 so that rapid feed shaft 58 retracts enabling spring 62 to pull the spindle along track 19 until friction pad 69 on the tapered end of the chuck rod contacts surface 67 on the workpiece as shown in FIG. 3b thereby synchronizing the rotational rate of the workpiece with that of the chuck rod and spindle. At this moment spring 25 is still compressed. After the friction pad contacts the workpiece the rapid feed shaft continues to retract until cam 55 actuates switch 61 whereupon air is removed from the chuck actuator causing actuator arm 63 to retract. At this time the rapid feed shaft is not in contact with precision ball slide extension 59 and therefore the motion of the spindle toward the cutting tool is restricted by the workpiece. As the actuator arm moves away from the chuck rod toward switch 78, spring 25 forces the chuck rod to the left and the spindle to the right until surface 72 of the workpiece sets against the spindle face as shown in FIG. 3c. In addition, as the chuck rod moves to the left, the tapered end of the rod forces the chuck jaws 23 outward into contact with the interior cylindrical surface 73 of the workpiece in preparation for withdrawing the workpiece from the transfer mechanism. It should be noted that now the friction pad is not in contact with surface 67. When the actuator arm has retracted fully, cam 64 actuates switch 78 whereupon air is supplied to the rapid feed mechanism so that once again the rapid feed shaft 58 engages ball slide extension 59 and translates the spindle assembly in track 19 until switch 60 is actuated at which time the work is moved clear of the transfer mechanism. Actuation of switch 60 removes air from the transfer mechanism causing the transfer arm to retract until cam 53 actuates switch 50 whereupon the rapid feed mechanism is deenergized and spring 62 once again pulls the ball slide to the right in track 19 until ball stop 74 rests against fine feed screw 75. The rapid feed shaft continues to retract until cam 55 actuates switch 61 causing electrical power to be applied to the fine feed drive motor 82 on leads 83 and 84 to rotate the fine feed screw so as to enable the spindle to move the right under the pull of spring 62 and carry the work into cutting tool 28 at a controlled rate. At the completion of the cutting process, cam 70 actuates switch 81 resulting in a reversal of the polarity of excitation to fine feed motor 82 so that cam 70 is driven back into contact with switch 80. Actuation of switch 80 energizes the rapid feed mechanism causing rapid feed shaft 58 once again to drive the ball slide extension against switch 60.

The work is unloaded from the chuck mechanism essentially by reversing the procedure used for loading. Thus, with the ball slide extension forced back against switch 60 by the rapid feed shaft, the transfer arm is extended to place the axis of rotation of the work holder in collinear alignment with the spindle longitudinal axis. The rapid feed mechanism is then deenergized to enable spring 62 to pull the spindle to the right until the workpiece contacts magnet 43 whereupon the rotational rate of the work holder is synchronized with the spindle and chuck mechanism. Then, the chuck actuator extends arm 63 to push the chuck rod to the right. This action forces the friction pad against surface 67 on the work thereby placing the work firmly in contact with the magnet and removing the chuck jaws from contact with interior cylindrical surface 73. Thereafter, the rapid feed mechanism extends rapid feed shaft 58 to withdraw the spindle and chuck mechanism from the work. Finally, the transfer arm is retracted and the air supply to the turbine is shut off to stop the work holder.

In a high-speed production system, it may be considered advantageous to utilize two transfer mechanisms which are alternately moved into collinear alignment with the longitudinal axis of the spindle, one being used for loading and the other for unloading.

It should be noted that loading and unloading could also be accomplished with the work holder of the transfer mechanism permanently positioned in collinear alignment with the spindle longitudinal axis. Operation in this manner could be accomplished by replacing magnet 43 with a ring magnet concentrically mounted within holder 44 in the transfer mechanism and mounting the tool assembly in a slotted fixture so that the cutting tool can be moved through the opening in the ring magnet into contact with a workpiece held in the chuck mechanism. It should also be noted that the workpiece could be unloaded from the rotating chuck mechanism by other means if desired. For instance, the chuck actuator could operate to actuate the chuck rod as explained above to eject the rotating work into a fluid bath moved into position during the unloading cycle. In general, any of the various parts such as the spindle assembly, tool assembly or transfer mechanism in either a horizontally or vertically oriented machine tool may be moved relative to one another.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a machine tool system including a tool, a rotatable spindle and a chuck mechanism, the combination comprising:
   a. means for imparting rotation to the spindle and chuck mechanism;
   b. a transfer mechanism having a rotatable work holder;
   c. means for supporting the rotatable work holder with its axis of rotation in collinear alignment with the axis of rotation of the spindle and chuck mechanism;
   d. means for rotating the work holder at a rate approximately equal to the rotational rate of the spindle and chuck mechanism; and
   e. means for transferring a workpiece between the work holder and chuck mechanism while said work holder and chuck mechanism are rotating.

2. The apparatus of claim 1 wherein the transfer means includes means for synchronizing the rotational rates of the work holder and chuck mechanism preparatory to transferring the work therebetween.

3. The apparatus of claim 2 and further including a fine feed mechanism for controlling the rate of axial motion between the workpiece and tool.

4. The apparatus of claim 3 and further including means for moving the rotational axis of the work holder in and out of collinear alignment with the axis of rotation of the spindle and chuck mechanism.

5. The apparatus of claim 1 wherein the chuck mechanism comprises a chuck rod coaxially mounted within and keyed to the spindle and further including:
   a. means for controlling the axial position of the spindle relative to the transfer mechanism; and
   b. means for controlling the axial motion of the chuck rod relative to the spindle.

6. The apparatus of claim 1 wherein the chuck mechanism comprises:
   a. a chuck rod coaxially mounted within and keyed to the spindle, the chuck rod being slightly longer than the spindle;
   b. chuck jaws connected at one end to an expandable band attached to the spindle to hold the other end of the chuck jaws against the chuck rod; and
   c. a spring connected between the ends of the spindle and chuck rod remote from the chuck jaws.

7. The apparatus of claim 6 and further including:

a. means for controlling the axial position of the spindle relative to the transfer mechanism; and
b. means for controlling the axial position of the chuck rod relative to the spindle.

8. The apparatus of claim 7 wherein the means for controlling the axial position of the spindle relative to the transfer mechanism includes a ball slide and machine way mechanism on which the spindle is mounted, a rapid feed mechanism having an extendible shaft for engaging the ball slide to control the position thereof along the machine way mechanism and a spring connected to the ball slide so as to pull it toward the collinearly aligned work holder; and the means for controlling the axial position of the chuck rod relative to the spindle includes a chuck actuator having an extendible arm operating in conjunction with the spring of the chuck mechanism.

9. The apparatus of claim 8 wherein the chuck rod is tapered at the end proximate the chuck jaws.

10. The apparatus of claim 9 and further including means for sensing the limits of motion of the work holder, chuck actuator arm and rapid feed shaft.